April 14, 1942.   W. E. SHEELER   2,279,346
ELASTIC LACE STITCH STRAIN ABSORBING MEANS FOR HOSIERY AND THE LIKE
Filed July 1, 1939   6 Sheets-Sheet 2
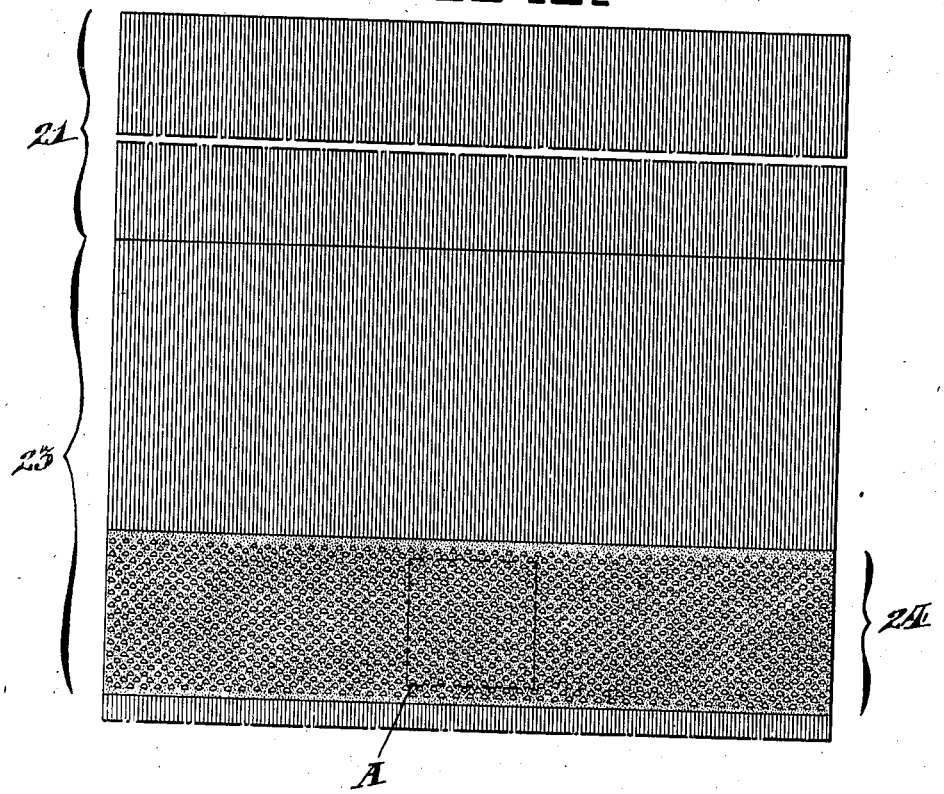
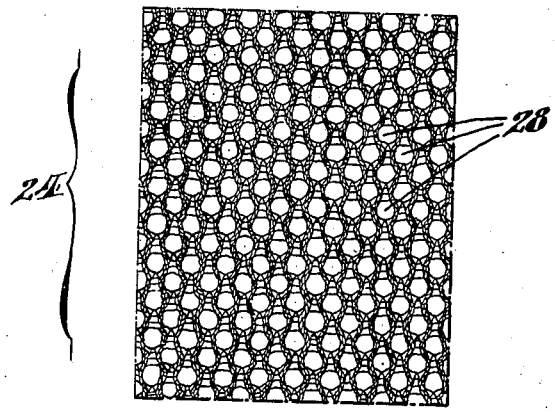
INVENTOR:
William E. Sheeler,
BY
ATTORNEY.

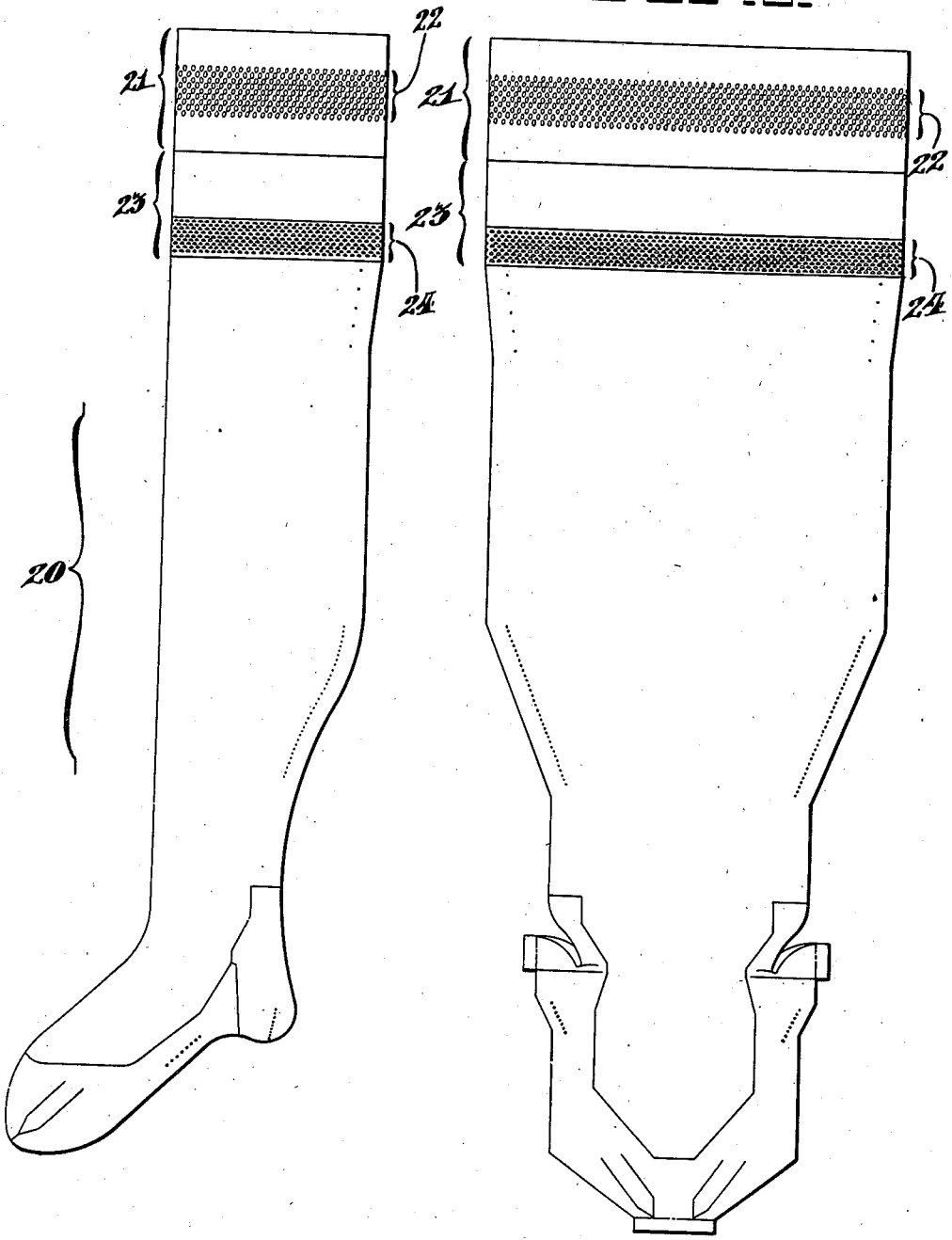

April 14, 1942. W. E. SHEELER 2,279,346
ELASTIC LACE STITCH STRAIN ABSORBING MEANS FOR HOSIERY AND THE LIKE
Filed July 1, 1939 6 Sheets-Sheet 5
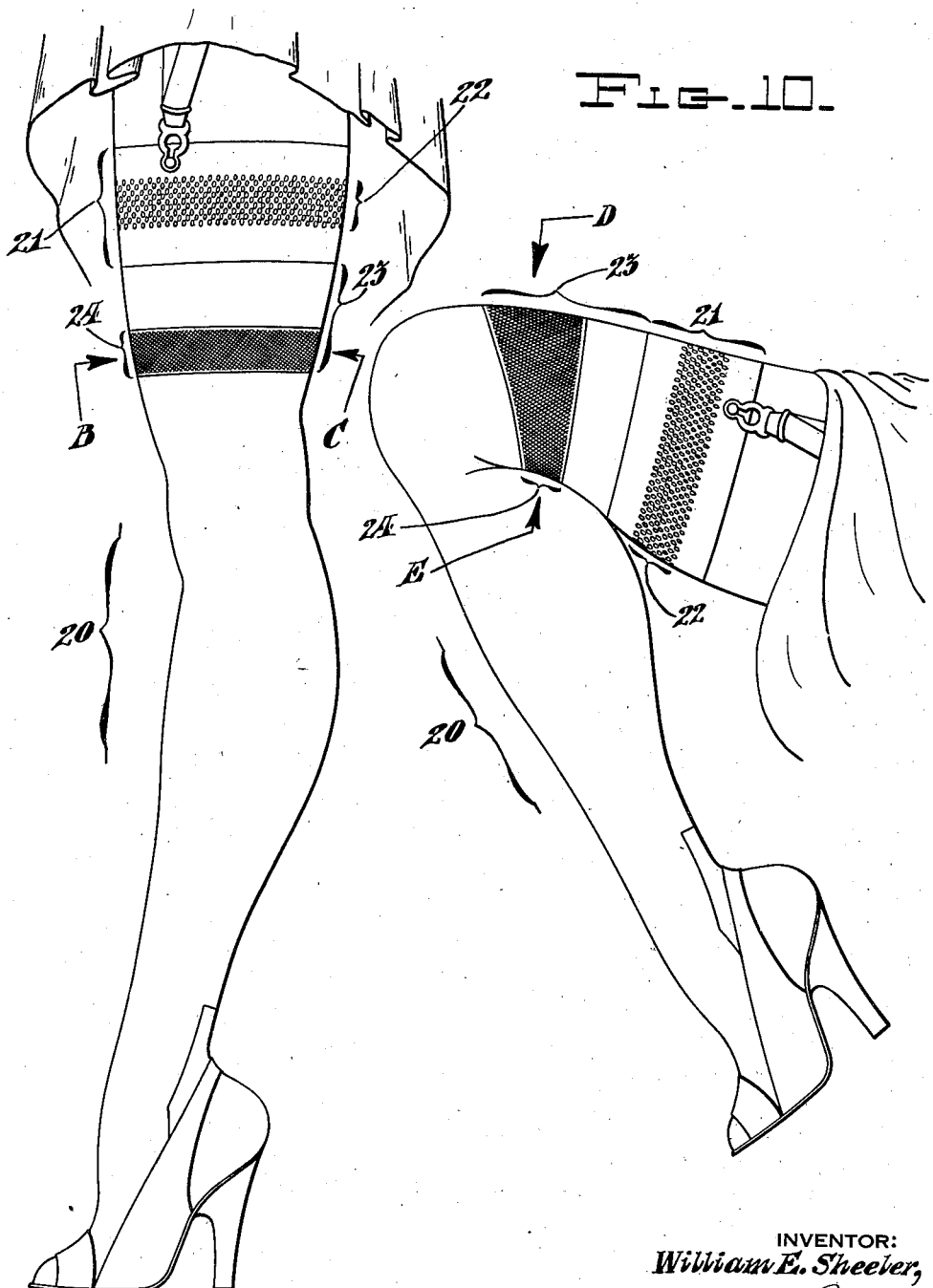

April 14, 1942. W. E. SHEELER 2,279,346
ELASTIC LACE STITCH STRAIN ABSORBING MEANS FOR HOSIERY AND THE LIKE
Filed July 1, 1939 6 Sheets-Sheet 6
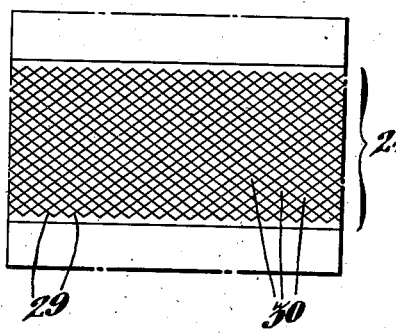
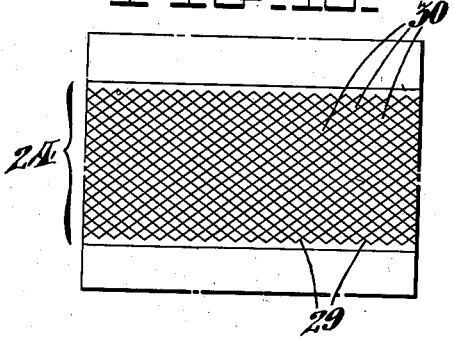
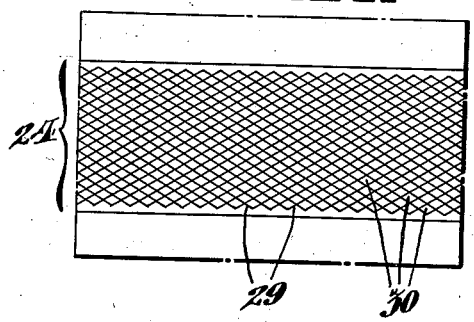
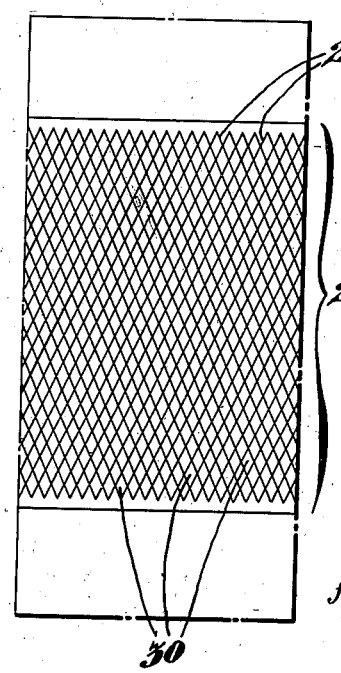
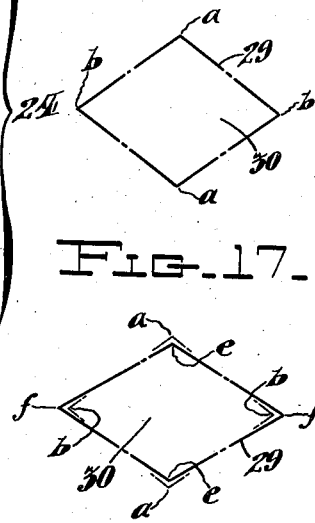
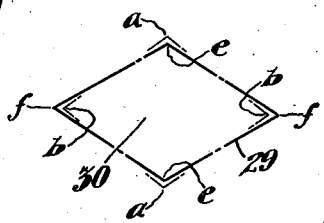
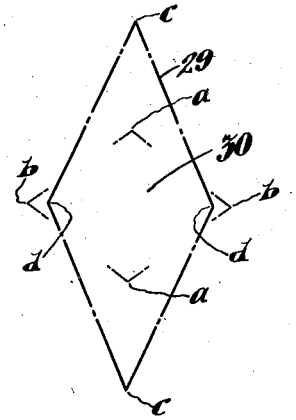
INVENTOR:
William E. Sheeler,
BY
ATTORNEY.

Patented Apr. 14, 1942

2,279,346

UNITED STATES PATENT OFFICE 2,279,346

ELASTIC LACE STITCH STRAIN ABSORBING MEANS FOR HOSIERY AND THE LIKE

William E. Sheeler, Spring Township, Berks County, Pa., assignor to Berkshire Knitting Mills, Wyomissing, Pa., a corporation of Pennsylvania Application July 1, 1939, Serial No. 282,513

3 Claims. (Cl. 66—172)

My invention relates to knitted fabric of the type consisting entirely of elastic yarn, and more particularly to such fabric having non-curling characteristics. It relates further to hosiery or other garments having zones of such knitted elastic fabric incorporated therein.

Heretofore, a zone or zones of elastic fabric have been embodied between the welt and the knee of full length full fashioned silk hose to relieve the stitches knitted of inelastic yarn of the strain caused by bending the knee. Depending upon the method of knitting, and the loop formation selected, difficulty was experienced with such arrangements due to curling of the elastic zone, a feature which made the hose unattractive in appearance and lessened the sales appeal of the same. This difficulty as to appearance was somewhat reduced by dividing the necessary number of courses of elastic yarn between several narrow circumferential bands, but this increased the cost of the stockings. Further, the elastic yarn suitable for use in silk stockings costs more per unit length than the silk yarn, making the hose with protective elastic zones undesirably high in cost.

It is an object of my invention to provide a knitted fabric entirely of elastic yarn of substantially non-curling character and having a high percentage of stretch in the walewise direction, whereby the amount of elastic yarn used may be decreased.

Another object of my invention is to provide a stocking having a strain absorbing zone therein, all of elastic yarn, which zone has two-way stretch, is adapted to remain substantially flat in use, and has an unusually high degree of walewise elasticity in proportion to its unstretched dimension.

Among other objects of the invention are, to knit elastic hosiery having an integral two-way stretch strain absorbing zone including a circumferential band of fabric knit from fine gauge rubber yarn; to construct such a circumferential band of fabric comprising a lattice of intersecting ribs extending diagonally, and in opposite directions, with respect to the direction of the courses, and relatively movable about their points of intersection so as to narrow their longitudinally disposed opposite angles when the stocking is longitudinally stretched thereby compensating by their effective length increase lengthwise of the stocking for their diminution in elasticity incident to their thickness; and to arrange said intersecting ribs to form meshes surrounding relatively large holes, said ribs being derived from loops transferred to the right and left from their normal wale positions in the areas of said holes.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings:

Figure 1 is an elevation of a full fashioned stocking embodying the invention;

Fig. 2 is an elevation of the blank from which the stocking of Fig. 1 was made;

Fig. 3 is a detail elevation on a larger scale of the upper portion of Fig. 1, in unstretched condition, a section of the welt being omitted;

Fig. 4 is a detail elevation of the elastic yarn portion of Fig. 3 enclosed within the dot-and-dash rectangle A when substantially maximum universal stretch is applied thereto;

Fig. 9 is a view showing the relative position of the structural elements in the elastic portion of the stocking shown in Fig. 1 when the stocking is only moderately stretched as in actual use;

Fig. 10 is a view similar to Fig. 9 but showing the relative position of the structural elements of the elastic portion of the stocking when strongly stretched due to the bending of the knee of the wearer;

Figs. 11 and 12 are detail elevational views of the elastic zone portions indicated by the arrows B and C, respectively, in Fig. 9, both portions enlarged to the same scale;

Figs. 13 and 14 are detail elevational views of the elastic zone portions indicated by the arrows D and E, respectively, in Fig. 10, both portions enlarged to the same scale;

Figure 5:
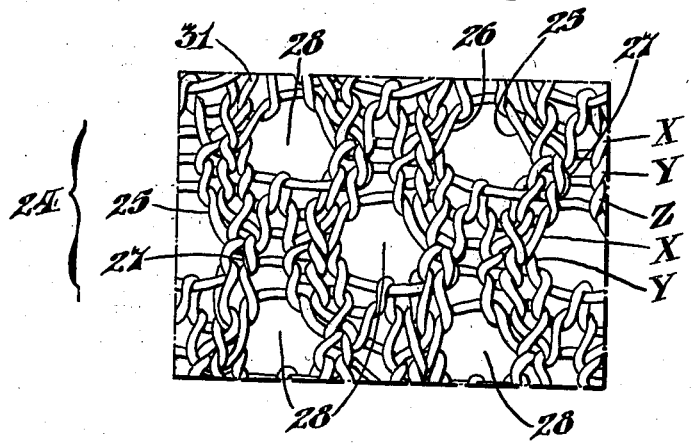
Fig. 5 is a detail view of a portion of Fig. 3 greatly enlarged, in unstretched condition.

Fig. 15 is a diagrammatic illustration of one of the unstretched diamond-shaped structural elements of the elastic zone portions depicted by Figs. 11 and 12; and Figs. 16 and 17 are diagrammatic illustrations showing the displacement of the vertices of the diamond-shaped structural element of Fig. 15, when the fabric 24 is stretched walewise and coursewise, as indicated by Figs. 13 and 14, respectively.

An elastic fabric within my invention is knitted entirely of elastic yarn and comprises means forming two series of ribs or composite structural elements, those of each series being substantially parallel when the fabric is in relaxed condition but inclined to, and intersecting the ribs of the other series at an angle. Preferably, said ribs are formed by transferring stitches so that lace openings are formed in the fabric at the same time the ribs themselves are formed, thereby improving the appearance of the fabric. The ribs stiffen the fabric and minimize, if not entirely overcome, the curling tendency. All the courses of elastic yarn, which in one form may comprise about thirty, necessary for absorbing excessive strains in a stocking may therefore be placed in one elastic zone or circumferential band, and are so shown in the drawings; the number of courses being obviously variable and depending upon the elasticity desired. Further, the ribs of one series are inclined to the wales in one direction and those of the other series are inclined to the wales in the other direction to form diamond-shaped units whose axes lie one parallel to the wales and the other parallel to the courses of stitches. This arrangement of the ribs therefore permits an elongation of the fabric in the walewise direction by a lazy tongs action in addition to the elongation due directly to the elasticity of the yarn. Thus, in the case of a stocking having an integral two-way stretch strain-absorbing zone formed of elastic fabric within my invention, if the elastic ribs along the front of the stocking are stretched walewise while those along the rear of the fabric are not, the ribs at the rear of the stocking are free to expand coursewise and to permit the corners of the diamond-shaped units which are in coursewise alignment to move away from each other at the rear of the stocking and therefore permit the corners in coursewise alignment to move toward each other at the front of the stocking. The corners of the diamonds at the front of the stocking which are in walewise alignment therefore may move away from each other by a true lazy tongs actions, and thereby may relieve the strain on the stitches to a greater extent than would be expected from the elasticity of the yarn alone.

The embodiment of the invention illustrated in the drawings is a flat knitted full fashioned stocking 20 (Fig. 1) and a flat blank therefor, shown in Fig. 2. Stocking 20 has the usual welt 21, of inelastic silk or equivalent yarn, shown as containing a lace portion 22 having a known lace stitch or loop formation. Immediately below the welt is an "after-welt" 23, made in part of inelastic yarn of substantially the same weight as the yarn in the welt proper but containing also a lace portion 24 all of fine gauge elastic yarn, preferably knitted integrally with the rest of the after-welt 23, and having the same, or a different, lace stitch or loop formation as the portion 22. Portion 24 preferably extends entirely around the stocking; that is to say, entirely across the blank for stocking 20, but it may be terminated adjacent the edges of the blank so as to provide a seaming edge of silk, in well known manner.

When the wearer of stocking 20 bends the knee, the portion 24 stretches to relieve the inelastic sections of the stocking from much of the strain that would otherwise be placed thereon. To some extent, this action would be expected because of the elasticity of the yarn employed in portion 24, but the stitch formation which I employ in portion 24 is such as to afford extra lengthwise stretch not attributable entirely to the elastic yarn. The zone 24 need not, therefore, contain as many courses as would otherwise be the case, thereby economizing on the relatively expensive elastic yarn. The lace stitch or loop formation whereby this result is obtained is illustrated in detail in Figs. 4, 5, 6, 7 and 8.

As appears in Figs. 3 and 4, the general effect of the lace stitch used in elastic portion 24 of the after-welt is to produce a lattice of two sets of reinforcing ribs or lines of loops each inclined to the original wales and intersecting the line of the other set to form generally diamond-shaped elements.

Figure 7:
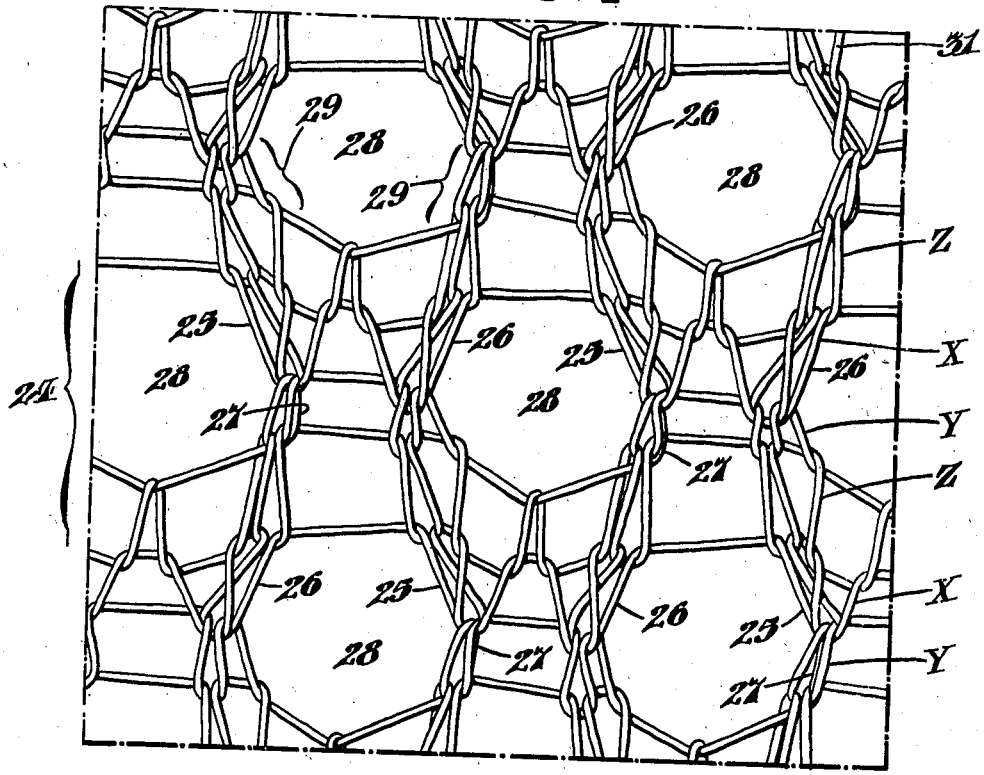
Fig. 7 is a detail elevation of the same fabric portion shown in Fig. 5, but showing the elastic fabric in stretched condition.

The loop arrangement is best shown in Figs. 5 and 7, from which it appears that the intersecting lines of loops are produced by the following method: one group of loops 25, spaced in the coursewise direction in a given course X, is transferred to the right (as viewed in the drawings) and a group of loops 26, adjacent said transferred loops in the same course, is transferred to the left. Also, loops of a group 27 in the next course Y and in the same wales as the loops in group 25 are transferred to the right, but no other loops are transferred in the course containing group 27. A needle loop and a sinker loop in the course containing loops 27 thereby are left partially unsupported and straighten out supplying additional yarn to adjacent loops and enlarging the apertures 28 made in the fabric by the operations of transferring loops 25, 26 and 27. No loops are transferred in a course Z directly following the one containing loops 27.

The fabric illustrated in the drawings is disclosed the same as it appears from the outside of the stocking when worn, and the transferred stitches 25, 26 and 27, therefore, are shown beneath other stitches.

The process of transferring loops, one right and one left, from adjacent wales in one course, and one right from the same wale as the first but in the next course, is then repeated but in wales intermediate those in which loops were first transferred. After loops have been transferred in the wales intermediate those first operated on, loops are again transferred in the wales first operated on, so that the apertures 28 of successive coursewise rows are offset in the coursewise direction. The resulting elastic fabric is not only ornamental, but is substantially free of the tendency to curl.

Figure 6:
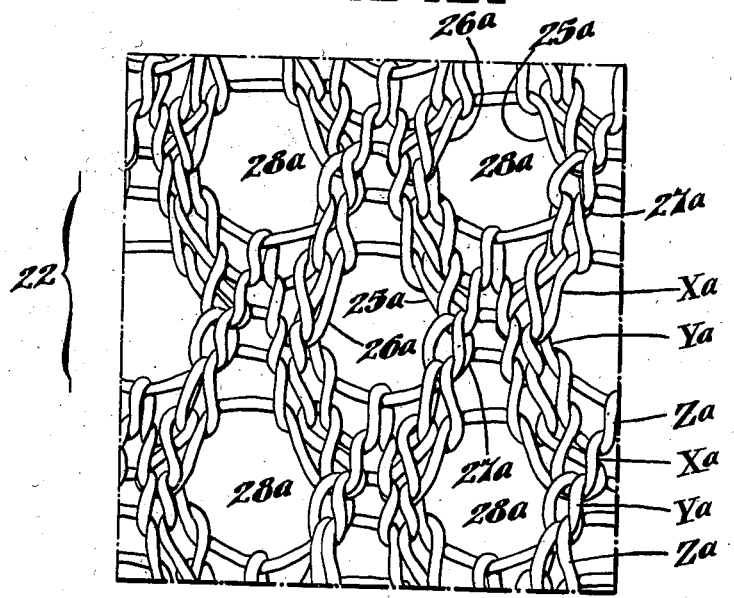
Fig. 6 is an elevation of a small part of the lace section of the inelastic portion of the welt shown in Figs. 1 and 2 drawn to the same scale as Fig. 5.
Figure 8:
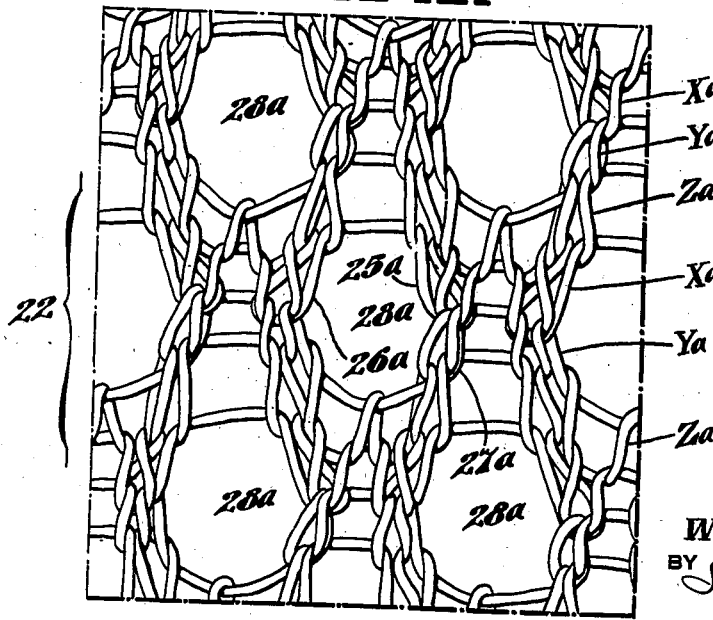
Fig. 8 is a detail elevation of the same fabric portion shown in Fig. 6, but showing the inelastic fabric in stretched condition.

While forming no part of the invention claimed herein, I have shown the welt 21 as having a lace section 22 therein for the purpose of ornamentation, section 22 being formed with the same lace stitch or loop formation as section 24 (Figs. 6 and 8). Consequently, the corresponding loops and courses in the inelastic section 22 have been designated by the same reference characters as in the elastic section, but with the letter a suffixed thereto.

A comparison of the action of lace section 22 of inelastic yarn with lace section 24 of elastic yarn shows the importance of the stitch formation illustrated in a strain absorbing zone of elastic yarn. In Figs. 5 and 6 are shown two small rectangular portions of fabric respectively from zones 24 and 22, both in unstretched condition. It will be noted that the apertures in the elastic section 24 of Fig. 5, are smaller than those in the unstretched comparatively inelastic fabric 22 of Fig. 6. This is due to the tensioning of the elastic yarn during knitting, which is more or less difficult to avoid.

In Figs. 7 and 8 are shown the same two sections as in Figs. 5 and 6, but having substantially the same pull applied to each. The difference in the degree of stretch is evident and the excess stretch of the elastic, over the inelastic, zone is available to relieve tension on the portions of the stocking knitted of inelastic yarn. However, the portions shown in Figs. 5 to 8 inclusive are so small that the overall interaction between different parts of the zone 24, whereby the principal advantages of the particular zone illustrated are obtained, are not clearly apparent. These advantages are best shown in Figs. 9 to 17 inclusive, of which Figs. 13 and 14 represent portions of elastic fabric of the same size but under different conditions of stretch; whereas, Figs. 11 and 12 show the same two portions as Figs. 13 and 14, respectively, as they appear when they are unstretched.

As is diagrammatically shown in Figs. 9 to 14 inclusive, the transferred loops of the lace portion 24 result in intersecting diagonal rib-like structural elements 29 which form generally diamond shaped figures 30 each defining an aperture 28 (Fig. 5). As is clear from Fig. 9, when there is no walewise strain applied to the strain absorbing zone 24, the diamonds 30 will have substantially the same shape both at the front and the back of the stocking, as shown in Figs. 11 and 12, respectively. However, when the wearer of a stocking containing a strain absorbing zone 24 of elastic yarn bends the knee, as illustrated in Fig. 10, the stocking stretches more in the walewise direction at the front than at the rear. The effect of this in the elastic zone 24 is shown in Figs. 13 and 14. From these figures, it will be noted that the diamonds 30 in the rear part of the stocking (Fig. 14) are free to expand in the coursewise direction to permit the coursewise spaced corners of the diamonds 30 at the front of the stocking to draw closer together (see Fig. 13) and thereby to contribute to the lengthening of the diamonds 30 by a lazy tongs action in addition to the stretch of the individual yarn elements due to their elasticity. The action of the diamond shaped elements 30 is illustrated in detail in Figs. 15 to 17 inclusive. Assuming that the vertical corners of a diamond in the area or zone 24, as shown in Figs. 11 and 12, are at points $a$ and the horizontal corners of the diamond are at points $b$, as shown in Fig. 15, when the zone 24 is stretched vertically as in Fig. 13, the points $a$ of the diamond move away from each other to the points $c$, as shown in Fig. 16, while the points $b$ move horizontally to arrive at points $d$. From Fig. 17, it will be noted that simultaneous with this action at the front of the stocking, the portion of zone 24 at the rear of the stockings contracts vertically (as shown in Fig. 14), which causes the points $a$ to move toward each other, vertically to points $e$ and the points $b$ to move away from the vertical line extending through the points $a$ to points $f$, these movements of the corners $a$ and $b$ relative to each other changing the angles of the elements 29 relative to each other and also relative to the wales and the courses.

While I believe that the lazy tongs action takes place as just described, and that this accounts, for the greater part at least, for the unusually high elasticity of the elastic strain absorbing zone 24, I do not desire to be limited by this explanation, since other factors, such as sliding co-action of the loops and yarns, may also have a cooperative effect in the attainment of this result.

It is also pointed out that the intersecting reinforcing ribs extend diagonally and in opposite directions with respect to the direction of the courses, and are relatively movable about their points of intersection so as to narrow their longitudinally disposed opposite angles when the stocking is longitudinally stretched, thereby compensating by their effective length increase lengthwise of the stocking for diminution in elasticity which the ribs suffer incident to their thickness. Further, the relatively thick lattice formation of the fabric provides a system of diagonal reinforcing struts which, by virtue of the thickness of the ribs, overcomes the tendency of the fabric to curl. The fact that the ribs extend in opposite direction establishes a balanced relationship of the parts of the stocking above and below the rubber elastic zone, which inhibits any tendency for these parts to twist out of longitudinal alignment.

As is clear from the drawings, the elastic yarn 31 used in section or zone 24 is of the fine gauge now available for incorporation into silk stockings. The stocking containing zone 24 may be knitted on a 42—or finer gauge, full fashioned knitting machine, and the yarn, both elastic and inelastic, is therefore necessarily fine enough to be used in such a machine. The yarn used in welt 21 and in the inelastic section of the after-welt 23, if knitted on a 42-gauge machine, may be of eight or nine thread silk, while the elastic yarn for section 24, may be somewhat heavier. Elastic yarn as fine as this is at present made in accordance with the patent to Adamson, No. 1,822,847, September 8, 1931. The Adamson yarn has a core of rubber or vulcanized rubber latex wound with fine silk or other thread. However, I do not limit myself to the use of such Adamson elastic rubber yarn. Preferably, the elasticity of the elastic yarn used is not more than 110%, but desirable results may be attained with elastic yarn of greater or lesser elasticity. The portion of said stocking below the after-welt is, as usual, made of finer gauge silk than that used in the welt and after-welt, except for certain reinforced portions in and near the foot.

Of course, the improvements specifically shown and described by which I obtain the referred to results, can be changed and modified in various ways without departing from the invention herein disclosed and hereinafter claimed.

I claim as my invention:

1. A non-curling knitted lace fabric entirely of elastic yarn having apertures in coursewise rows, apertures in adjacent rows being staggered in the coursewise direction, and each aperture having, along one edge, two stitches transferred in a given direction from a given wale in succeeding courses and, along another edge, another stitch transferred in the opposite direction from a wale next to said given wale and in one of said courses.

2. Knit hosiery having an integral two-way stretch strain absorbing zone, including a circumferential band of fabric knit from fine gauge rubber yarn, said band of fabric comprising a lattice of intersecting reinforcing ribs extending diagonally, and in opposite directions, with respect to the direction of the courses, and relatively movable about their points of intersection so as to narrow their longitudinally disposed opposite angles when the stocking is longitudinally stretched, thereby compensating by their effective length increase lengthwise of the stocking, for the diminution in elasticity which the ribs suffer incident to their thickness.

3. Knit elastic hosiery having an integral two-way stretch strain absorbing zone, including a circumferential band of fabric knit from fine gauge rubber yarn, said band of fabric comprising a lattice of intersecting reinforcing ribs extending diagonally, and in opposite directions, with respect to the direction of the courses, and relatively movable about their points of intersection so as to narrow their longitudinally disposed opposite angles when the stocking is longitudinally stretched, thereby compensating by their effective length increase lengthwise of the stocking, for their diminution in elasticity incident to their thickness, said intersecting ribs forming meshes surrounding relatively large holes, said ribs being derived from loops transferred to the right and left from their normal wale positions in the areas of said holes.

WILLIAM E. SHEELER.